(12) United States Patent
Jung et al.

(10) Patent No.: US 8,588,331 B2
(45) Date of Patent: Nov. 19, 2013

(54) TRANSMITTER SYSTEM FOR TRANSMITTING PARALLEL DATA BY COMPENSATING FOR CROSSTALK

(75) Inventors: Hae Kang Jung, Gwangmyeong-si (KR); Hong June Park, Pohang-si (KR)

(73) Assignee: Postech Academy-Industry Foundation, Pohang-Si, Gyeongsangbuk-Do (KR)

( * ) Notice: Subject to any disclaimer, the term of this patent is extended or adjusted under 35 U.S.C. 154(b) by 268 days.

(21) Appl. No.: 13/166,452

(22) Filed: Jun. 22, 2011

(65) Prior Publication Data

US 2011/0317787 A1    Dec. 29, 2011

(30) Foreign Application Priority Data

Jun. 25, 2010    (KR) .................. 10-2010-0060397

(51) Int. Cl.
*H03F 1/34*    (2006.01)

(52) U.S. Cl.
USPC ........................................... 375/296

(58) Field of Classification Search
USPC ........... 327/2, 156; 333/1, 238; 370/201, 241, 370/252, 311, 347, 351, 537; 375/257, 296, 375/355, 375; 455/114.2, 323; 710/305; 713/189
See application file for complete search history.

(56) References Cited

U.S. PATENT DOCUMENTS

| | | | | |
|---|---|---|---|---|
| 2002/0153936 A1* | 10/2002 | Zerbe | ............................ | 327/336 |
| 2003/0202502 A1* | 10/2003 | Bae et al. | ...................... | 370/347 |
| 2009/0313482 A1* | 12/2009 | Master et al. | .................. | 713/189 |
| 2010/0134349 A1* | 6/2010 | Lennen et al. | ........... | 342/357.03 |

* cited by examiner

*Primary Examiner* — Sam K Ahn
*Assistant Examiner* — Shawkat M Ali
(74) *Attorney, Agent, or Firm* — Kile Park Reed & Houtteman PLLC

(57) ABSTRACT

A transmitter system for transmitting parallel data by compensating a crosstalk includes: first and second transmission lines parallel to each other; a first inverted crosstalk pulse generation unit configured to receive first transmission data and inverted first transmission data and output a first inverted crosstalk pulse according to a data mode; a second inverted crosstalk pulse generation unit configured to receive second transmission data transmitted in parallel to the first transmission data and inverted second transmission data and output a second inverted crosstalk pulse according to the data mode; a first addition unit configured to combine the first transmission data and the second inverted crosstalk pulse and output first compensation data to be transmitted to the first transmission line; and a second addition unit configured to combine the second transmission data and the first inverted crosstalk pulse and output second compensation data to be transmitted to the second transmission line.

15 Claims, 9 Drawing Sheets

FIG. 9
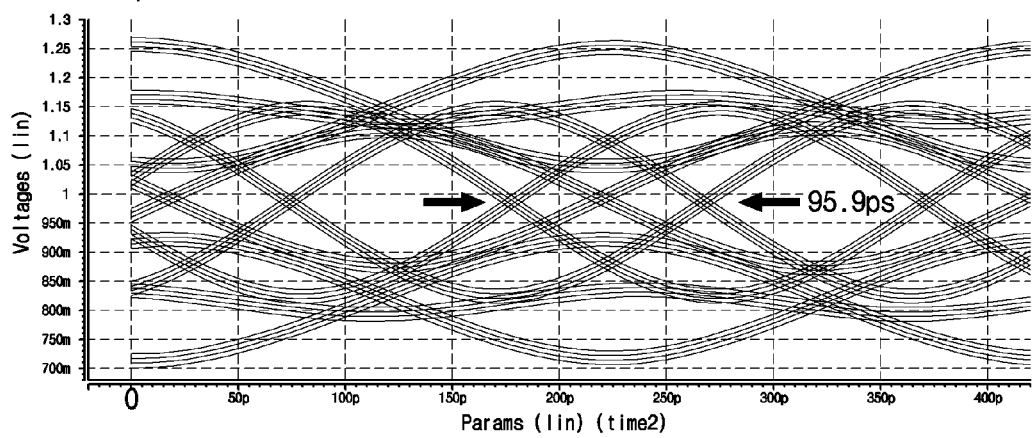
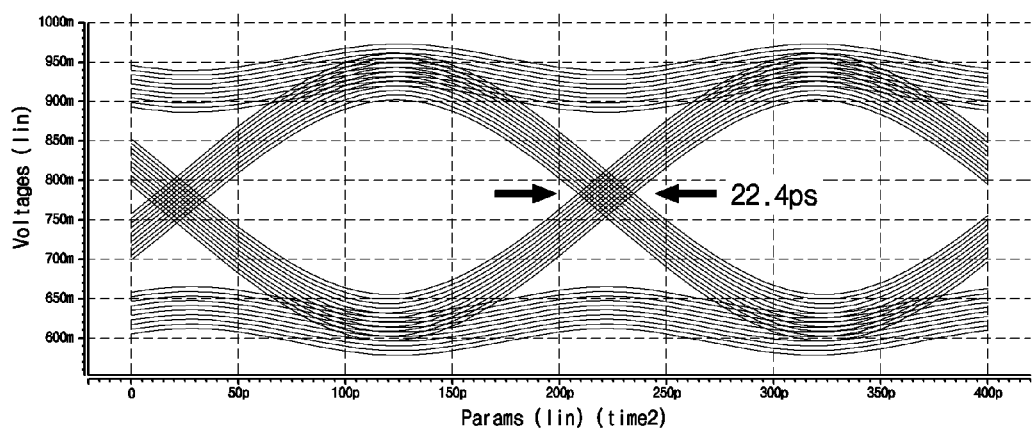

TRANSMITTER SYSTEM FOR TRANSMITTING PARALLEL DATA BY COMPENSATING FOR CROSSTALK

BACKGROUND OF THE INVENTION

1. Field of the Invention

The present invention relates to a system for transmitting parallel data, and more particularly, to a transmitter system for transmitting parallel data by compensating for a crosstalk to reduce a far-end crosstalk in a receiver.

2. Description of the Related Art

Crosstalk is a phenomenon caused by electromagnetic coupling between transmission lines adjacent in parallel, and causes a timing jitter during high-speed signal transmission.

In the case of a transmission line positioned in a uniform medium like a strip line, the amount of capacitive coupling is equal to that of inductive coupling. Therefore, a crosstalk in a receiver becomes zero.

In the case of a micro strip line positioned over a printed circuit board, however, the amount of inductive coupling is larger than that of the capacitive coupling. Therefore, when data of any one transmission line transitions in a positive direction, a negative crosstalk occurs in a receiver of another transmission line adjacent in parallel.

On the other hand, when data of any one transmission line transitions in a negative direction, a positive crosstalk occurs in a receiver of another transmission line adjacent in parallel.

At this time, the magnitude $V_{FEXT}(t)$ of a far-end crosstalk occurring in the receiver may be expressed as Equation 1 below.

$$V_{FEXT}(t) = \frac{1}{2}\left(\frac{C_m}{C_t} - \frac{L_m}{L_s}\right) TD \times \frac{dVa(t-TD)}{dt}, (TD = \sqrt{L_s C_t})  \quad \text{Eq. 1}$$

Here, TD represents a transmission time when a signal is transmitted through a transmission line (static mode), Va represents a signal applied from a transmitter, $L_s$ represents self-inductance, $L_m$ represents mutual inductance between two transmission lines, $C_m$ represents mutual capacitance between two transmission lines, and $C_t$ represents the sum of self-capacitance and mutual capacitance.

FIG. 1 is a timing diagram of a conventional transmitter system in an odd mode, an even mode, and a static mode.

First, when independent signals are applied to micro strip transmission lines adjacent in parallel, respectively, the odd mode, the even mode, and the static mode may be defined as follows.

The odd mode correspond to a case in which the respective data of the transmission lines adjacent in parallel transition in different directions, the even mode corresponds to a case in which the respective data of the transmission lines adjacent in parallel transition in the same direction, and the static mode corresponds to a case in which any one of the data does not transition.

Referring to FIG. 1, when it is assumed that an inductive coupling coefficient is larger than a capacitive coupling coefficient, data waveforms of the receiver in the respective data modes may be described as follows.

In the odd mode, when data of a first transmission line transitions in the positive direction, data of a second transmission line adjacent in parallel transitions in the negative direction. Therefore, since the data of the second transmission line transitions in the negative direction, a positive crosstalk occurs in a receiver of the first transmission line.

In the even mode, when the data of the first transmission line transitions in the positive direction, the data of the second transmission line adjacent in parallel transitions in the positive direction. Therefore, since the data of the second transmission line transitions in the positive direction, a negative crosstalk occurs in the receiver of the first transmission line.

In the static mode, when the data of the first transmission line transitions in the positive direction, the data of the second transmission line adjacent in parallel does not transition. Therefore, since the data of the second transmission line does not transition, a crosstalk does not occur in the receiver of the first transmission line.

In the odd mode, a final signal reaches the receiver of the first transmission line fastest, due to the positive crosstalk. In the even mode, a final signal reaches the receiver of the first transmission line latest, due to the negative crosstalk.

A crosstalk induced jitter (hereinafter, referred to as 'CIJ') occurring at this time may be expressed as Equation 2 below.

$$CIJ = T_{de} - T_{do} = \sqrt{L_s C_t}\left(\frac{L_m}{L_s} - \frac{C_m}{C_t}\right) \quad \text{Eq. 2}$$

Here, $T_{de}$ represents a transmission time in the even mode, and $T_{do}$ represents a transmission time in the odd mode.

On the other hand, it may be assumed that the capacitive coupling coefficient is larger than the inductive coupling coefficient. In this case, in the odd mode, the final signal reaches the receiver latest, and in the even mode, the final signal reaches the receiver fastest.

A CIJ occurring at this time may be expressed as Equation 3 below.

$$CIJ = T_{do} - T_{de} = \sqrt{L_s C_t}\left(\frac{C_m}{C_s} - \frac{L_m}{L_t}\right) \quad \text{Eq. 3}$$

As described above, in the conventional transmitter system for transmitting parallel data, the respective data reach the receiver with a time difference set therebetween, depending on whether the data transition or not and the transition directions of the data. Therefore, a timing jitter occurs in the receiver. Furthermore, the timing jitter may limit high-speed parallel transmission of data.

SUMMARY OF THE INVENTION

Accordingly, the present invention has been made in an effort to solve the problems occurring in the related art, and an object of the present invention is to provide a transmitter system in which a transmitter previously compensates for an effect of crosstalk in transmitting parallel data, thereby reducing a jitter caused by a crosstalk in a receiver.

In order to achieve the above object, according to one aspect of the present invention, there is provided a transmitter system for transmitting parallel data by compensating a crosstalk. The transmitter system includes: first and second transmission lines parallel to each other; a first inverted crosstalk pulse generation unit configured to receive first transmission data and inverted first transmission data and output a first inverted crosstalk pulse according to a data mode; a second inverted crosstalk pulse generation unit configured to receive second transmission data transmitted in parallel to the first transmission data and inverted second transmission data and output a second inverted crosstalk pulse according to the data mode; a first addition unit configured to combine the first transmission data and the second inverted crosstalk pulse and output first compensation data to be transmitted to the first transmission line; and a second addition unit configured to combine the second transmission data and the first inverted crosstalk pulse and output second compensation data to be transmitted to the second transmission line.

BRIEF DESCRIPTION OF THE DRAWINGS

The above objects, and other features and advantages of the present invention will become more apparent after a reading of the following detailed description taken in conjunction with the drawings, in which:

FIG. 9 includes expanded diagrams showing simulation results obtained by using the transmitter system for transmitting parallel data by compensating a crosstalk according to the embodiment of the present invention, in micro strip transmission lines.

DETAILED DESCRIPTION OF PREFERRED EMBODIMENTS

Figure 1:
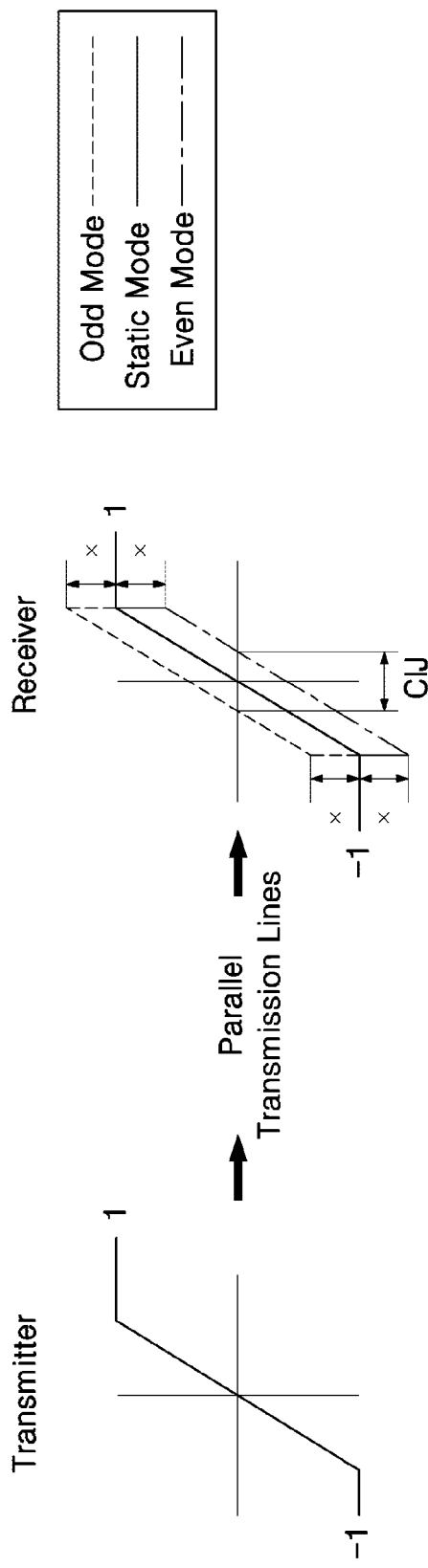
FIG. 1 is a timing diagram of a conventional transmitter system in an odd mode, an even mode, and a static mode.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
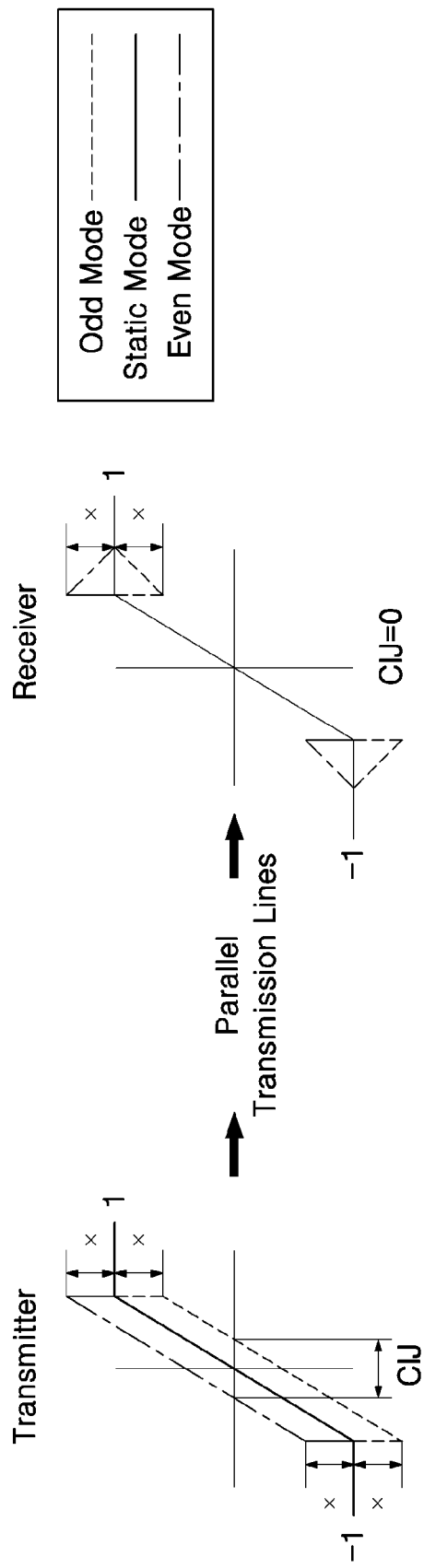
FIG. 2 is a timing diagram of a transmitter system for transmitting parallel data by compensating for a crosstalk according to an embodiment of the present invention, in the odd mode, the even mode, and the static mode.

FIG. 2 is a timing diagram of a transmitter system for transmitting parallel data by compensating for a crosstalk according to an embodiment of the present invention, in the odd mode, the even mode, and the static mode.

Referring to FIG. 2, the transmitter system for transmitting parallel data by compensating for a crosstalk according to the embodiment of the present invention adds an inverted signal corresponding to the magnitude (hereinafter, 'x') of a crosstalk which is to occur in a receiver.

For example, when it is assumed that an inductive coupling coefficient is larger than a capacitive coupling coefficient and data of a first transmission line transitions in a positive direction, the transmitter system according to the embodiment of the present invention operates as follows, according to the respective data modes.

Furthermore, in the following descriptions, data transmitted to the receiver through the first transmission line is referred to as first transmission data, and data transmitted to the receiver through a second transmission line is referred to be second transmission data.

In the odd mode, when the first transmission data transitions in the positive direction, the second transmission data transitions in the negative direction which is the opposite direction of the positive direction. In this case, a positive crosstalk having a magnitude of 'x' may occur in the receiver of the first transmission line.

Therefore, the transmitter system previously adds a negative crosstalk pulse having a magnitude of 'x' to the first transmission data to be transmitted to the first transmission line.

In the even mode, when the first transmission data transitions in the positive direction, the second transmission data also transitions in the positive direction. In this case, a negative crosstalk having a magnitude of 'x' may occur in the receiver of the first transmission line.

Therefore, the transmitter system previously adds a negative crosstalk pulse having a magnitude of 'x' to the first transmission data to be transmitted to the first transmission line.

In the static mode, even when the first transmission data transitions in the positive direction, the second transmission data does not transition. In this case, a crosstalk does not occur in the receiver of the first transmission line. Therefore, the transmitter system does not need to add a separate crosstalk pulse.

As such, when the transmitter system previously compensates for an effect of the crosstalk in the receiver, the receiver may reduce a timing jitter caused by the crosstalk. Theoretically, the transmitter may adjust the magnitude 'x' and transition level of the crosstalk in the receiver and then transmit data such that a CIJ caused by the crosstalk in the receiver becomes zero.

Figure 3:
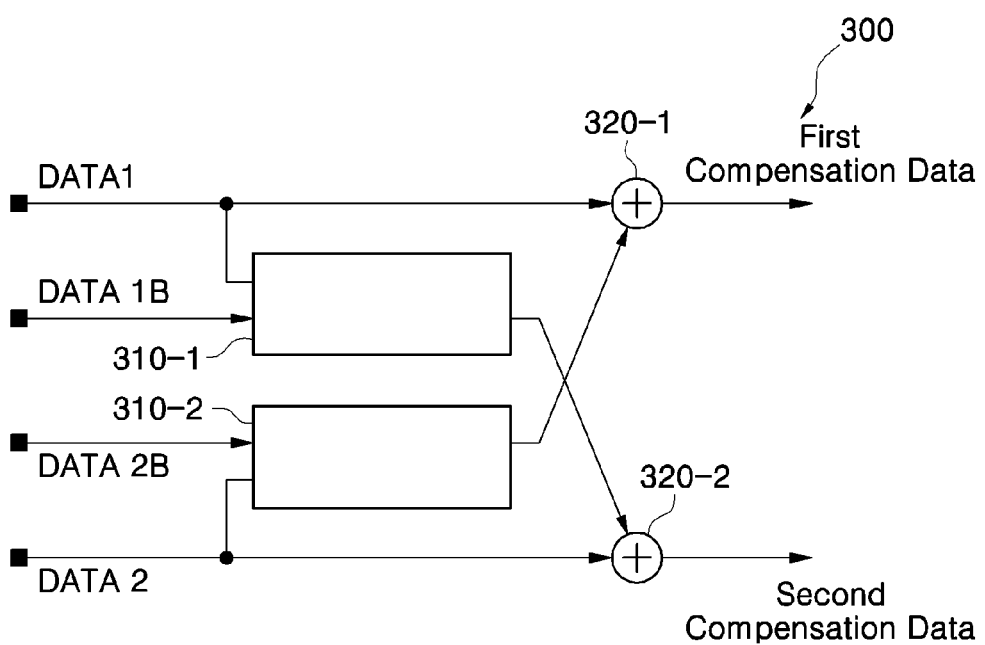
FIG. 3 is a block diagram of the transmitter system for transmitting parallel data by compensating for a crosstalk according to the embodiment of the present invention.

FIG. 3 is a block diagram of the transmitter system for transmitting parallel data by compensating for a crosstalk according to the embodiment of the present invention.

Referring to FIG. 3, the transmitter system 300 for transmitting parallel data by compensating for a crosstalk according to the embodiment of the present invention includes two transmission lines adjacent in parallel, first and second inverted crosstalk generation units 310-1 and 310-2, and first and second addition units 320-1 and 320-2.

The first inverted crosstalk generation unit 310-1 is configured to receive first transmission data DATA 1 and inverted first transmission data DATA 1B and output a first inverted crosstalk pulse according to a data mode.

The second inverted crosstalk generation unit 320-2 is configured to receive second transmission data DATA 2 and inverted second transmission data DATA 2B and output a second inverted crosstalk pulse according to the data mode.

The first addition unit 320-1 is configured to combine the first transmission data and the second inverted crosstalk pulse and output first compensation data. The second addition unit 320-2 is configured to combine the second transmission data and the first inverted crosstalk pulse and output second compensation data.

For example, when it is assumed that the inductive coupling coefficient is larger than the capacitive coupling coefficient and the first transmission data of the first transmission line transitions in the positive direction, the second inverted crosstalk pulse forming the first compensation data is generated as follows.

In the odd mode, when the first transmission data transitions in the positive direction, the second transmission data transitions in the negative direction which is the opposite direction of the positive direction. In this case, a positive crosstalk having a magnitude of 'x' may occur in the receiver of the first transmission line. Therefore, the second inverted crosstalk generation unit may output a negative crosstalk pulse having a magnitude of 'x'.

In the even mode, when the first transmission data transitions in the positive direction, the second transmission data also transitions in the positive direction. In this case, a negative crosstalk having a magnitude of 'x' may occur in the receiver of the first transmission line. Therefore, the second inverted crosstalk generation unit may output a positive crosstalk pulse having a magnitude of 'x'.

In the static mode, even when the first transmission data transitions in the positive direction, the second transmission data does not transition. Therefore, the second inverted crosstalk generation unit may not output an inverted crosstalk pulse.

Figure 4:
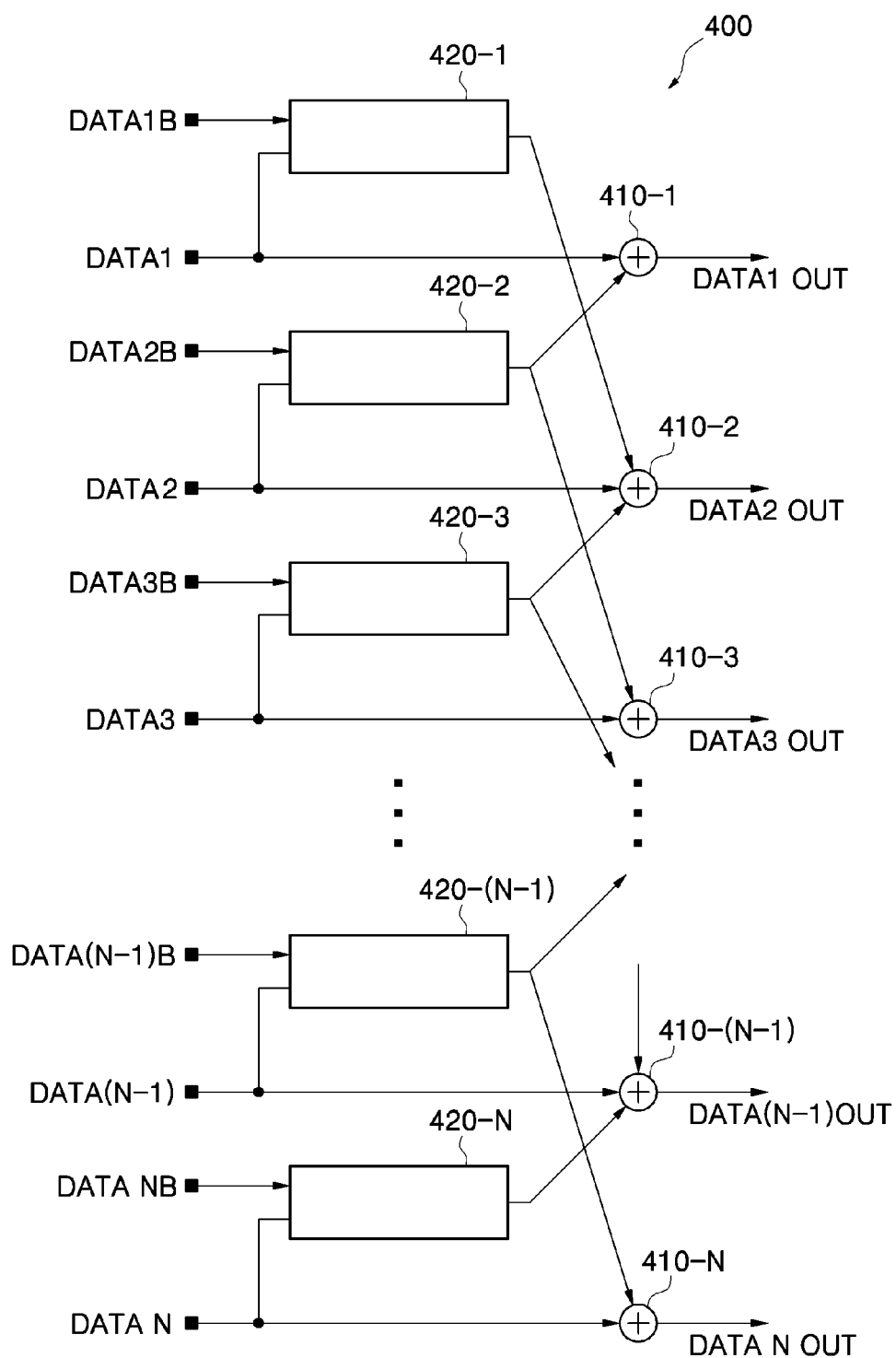
FIG. 4 is a block diagram of a transmitter system for transmitting parallel data by compensating for a crosstalk according to another embodiment of the present invention.

FIG. 4 is a block diagram of a transmitter system for transmitting parallel data by compensating for a crosstalk according to another embodiment of the present invention.

Referring to FIG. 4, the transmitter system 400 for transmitting parallel data by compensating for a crosstalk according to the embodiment of the present invention is a transmitter system having N data transmission lines (N is a natural number larger than three), and includes first to N-th inverted crosstalk generation units 410-1 to 410-N and first to N-th addition units 420-1 to 420-N.

The first inverted crosstalk generation unit 410-1 is configured to receive first transmission data DATA 1 and inverted first transmission data DATA 1B and outputs a first inverted crosstalk pulse according to a data mode.

The N-th inverted crosstalk generation unit 410-N is configured to receive N-th transmission data DATA N and inverted N-th transmission data DATA NB and outputs an N-th inverted crosstalk pulse according to the data mode.

The first addition unit 420-1 is configured to receive the first transmission data and a second inverted crosstalk pulse and output first compensation data, and the (N−1)-th addition unit 420-(N−1) is configured to receive (N−1)-th transmission data, an (N−2)-th inverted crosstalk pulse, and an N-th inverted crosstalk pulse and output (N−1)-th compensation data.

The N-th addition unit 420-N is configured to receive N-th transmission data and an (N−1)-th inverted crosstalk pulse and output N-th output data.

As such, when the number of transmission lines is three or more, the second to (N−1)-th transmission data cause interference with transmission lines in both sides thereof, and a double crosstalk occurs in comparison with when the number of transmission lines is two. In this case, the inverted crosstalk pulses need to be adjusted according to the data mode of both transmission lines.

Therefore, the (N−1)-th addition unit receives the N-th inverted crosstalk pulse as well as the (N−2)-th inverted crosstalk pulse and outputs the (N−1)-th compensation data.

For example, when it is assumed that the inductive coupling coefficient is larger than the capacitive coupling coefficient and the data of the (N−1)-th transmission line transitions in the positive direction, the inverted crosstalk pulse forming the (N−1)-th compensation data may be generated as follows.

In the odd mode, when the (N−1)-th transmission data transitions in the positive direction, the (N−2)-th transmission data and the N-th transmission data transition in the negative direction. In this case, a positive crosstalk having a magnitude of 2*'x' depending on the relation between the (N−2)-th transmission line and the N-th transmission line may occur in the receiver of the (N−1)-th transmission line.

Therefore, the (N−1)-th addition unit adds the negative crosstalk pulses having a magnitude of 'x', which are outputted from the N-th inverted crosstalk generation unit and the (N−2)-th inverted crosstalk generation unit, to the (N−1)-th transmission data, and then outputs the (N−1)-th compensation data.

In the even mode, when the (N−1)-th transmission data transitions in the positive direction, the (N−2)-th transmission data and the N-th transmission data also transition in the positive direction. In this case, a negative crosstalk having a magnitude of 2*'x' depending on the relation between the (N−2)-th transmission line and the N-th transmission line may occur in the receiver of the (N−1)-th transmission line.

Therefore, the transmitter system previously adds the positive crosstalk pulses having a magnitude of 'x', which are outputted from the N-th inverted crosstalk generation unit and the (N−2)-th inverted crosstalk generation unit, to the (N−1)-th transmission data, and then outputs the (N−1)-th compensation data.

Figure 5:
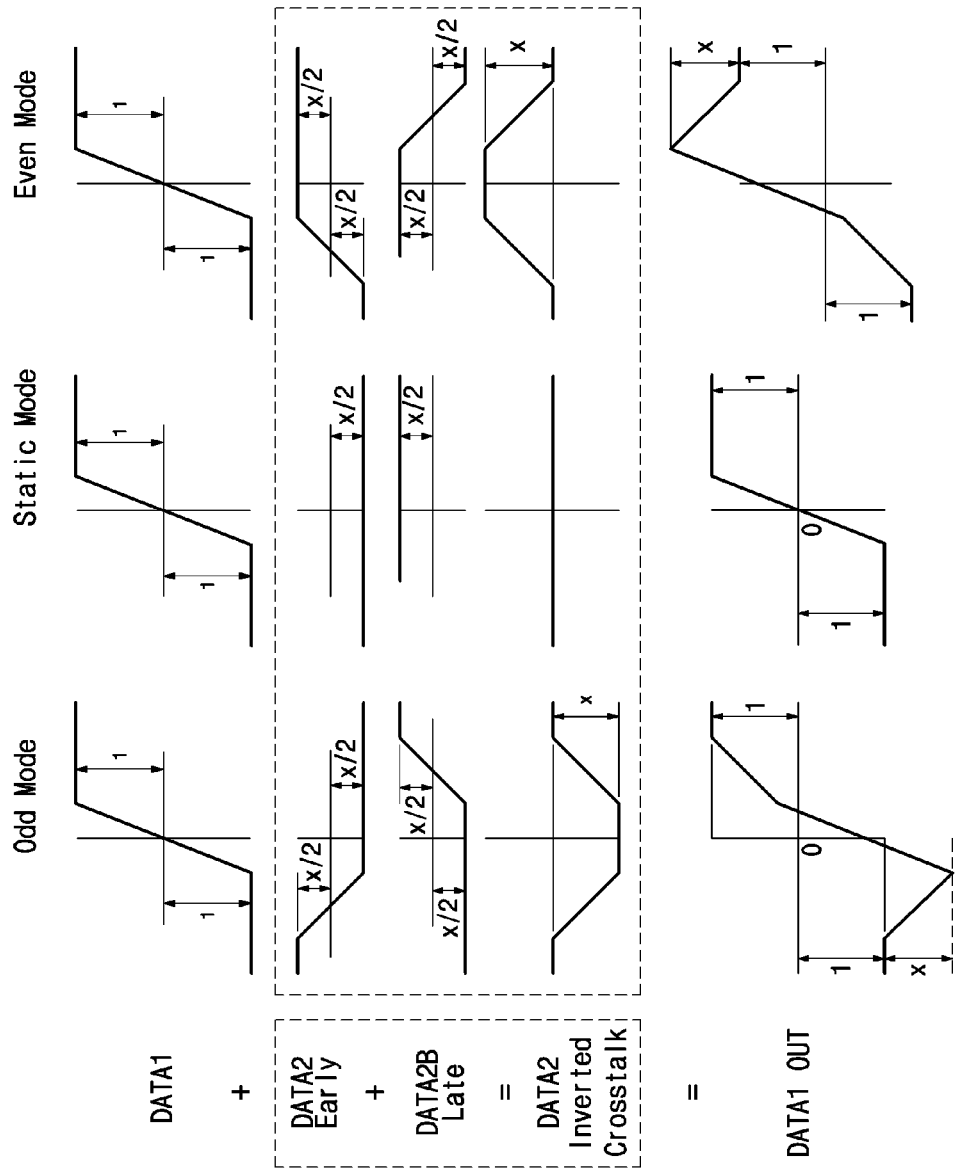
FIG. 5 is a diagram showing data waveforms for generating an inverted crosstalk pulse according to the respective data modes, when a inductive coupling coefficient is larger than a capacitive coupling coefficient.

FIG. 5 is a diagram showing data waveforms for generating an inverted crosstalk pulse according to the respective data modes, when the inductive coupling coefficient is larger than the capacitive coupling coefficient.

Referring to FIG. 5, when the first transmission data transitions in the positive direction in the odd mode, the second transmission data transitions in the negative direction which is the opposite direction of the positive direction. In this case, a positive crosstalk having a magnitude of 'x' may occur in the receiver of the first transmission line.

Therefore, the second inverted crosstalk generation unit generates second early data DATA2 Early and inverted second late data DATA2B Late. The second early data DATA2 Early may be acquired by causing the phase of the second transmission data to be led by 'CIJ' and amplifying the magnitude of the second transmission data by 'x/2'. The inverted second late data DATA2B Late may be acquired by causing the phase of the inverted second transmission data to be delayed by 'CIJ' and amplifying the magnitude of the inverted second transmission data by 'x/2'. Then, the second inverted crosstalk generation unit combines the second early data DATA2 Early and the inverted second late data DATA2B Late to generate a negative inverted crosstalk pulse having a magnitude of 'x'.

In this case, the magnitude of an ideal negative inverted crosstalk pulse is equal to 'x' which is the magnitude of the crosstalk in the receiver, and the width thereof is equal to the CIJ in the receiver. Finally, the first addition unit adds the negative inverted crosstalk pulse to the transmission data to be transmitted to the first transmission line, and generates and outputs the first compensation data.

In the even mode, when the first transmission data transitions in the positive direction, the second transmission data also transitions in the positive direction. In this case, a negative crosstalk having a magnitude of 'x' may occur in the receiver of the first transmission line.

Therefore, the second inverted crosstalk generation unit generates second early data DATA2 Early and inverted second late data DATA2B Late. The second early data DATA2 Early may be acquired by causing the phase of the second transmission data to be led by 'CIJ' and amplifying the magnitude of the second transmission data by 'x/2'. The inverted second late data DATA2B Late may be acquired by causing the phase of the inverted second transmission data to be delayed by 'CIJ' and amplifying the magnitude of the inverted second transmission data by 'x/2'. Then, the second inverted crosstalk generation unit adds the second early data DATA2 Early and the inverted second late data DATA2B Late to generate a positive inverted crosstalk pulse having a magnitude of 'x'.

In this case, the magnitude of an ideal positive inverted crosstalk pulse is equal to 'x' which is the magnitude of the crosstalk in the receiver, and the width thereof is equal to the CIJ in the receiver. Finally, the first addition unit adds the positive inverted crosstalk pulse to the transmission data to be transmitted to the first transmission line, and generates and outputs the first compensation data.

In the static mode, when the first transmission data transitions in the positive direction, the second transmission data does not transition. Therefore, an inverted crosstalk pulse is not generated in the static mode.

Figure 6:
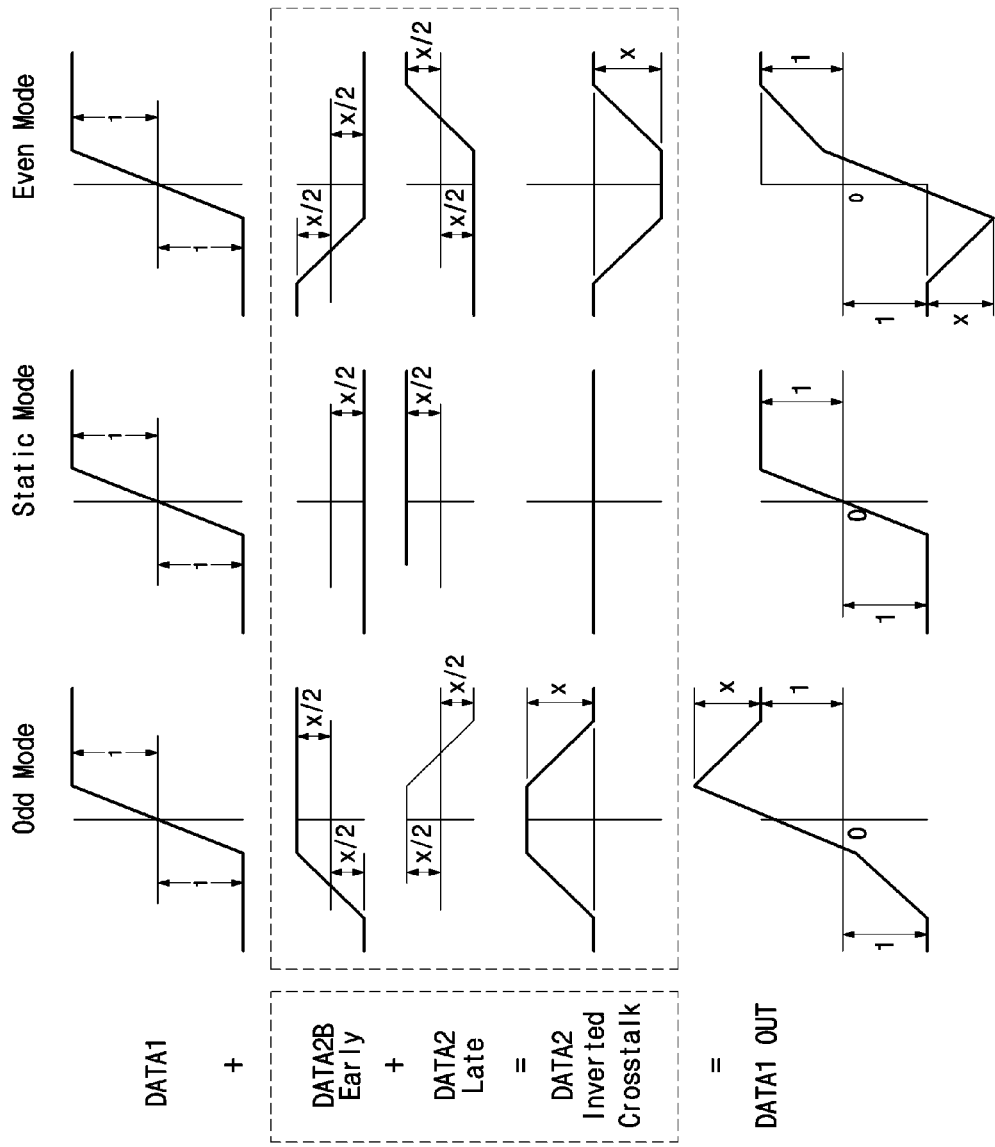
FIG. 6 is a diagram showing data waveforms for generating an inverted crosstalk pulse in the respective data modes, when the capacitive coupling coefficient is larger than the inductive coupling coefficient.

FIG. 6 is a diagram showing data waveforms for generating an inverted crosstalk pulse in the respective data modes, when the capacitive coupling coefficient is larger than the inductive coupling coefficient.

Referring to FIG. 6, when the first transmission data transitions in the positive direction in the odd mode, the second transmission data transitions in the negative direction which is the opposite direction of the positive direction. In this case, a negative crosstalk having a magnitude of 'x' may occur in the receiver of the first transmission line.

Therefore, the second inverted crosstalk generation unit generates inverted second early data DATA2B Early and second late data DATA2 Late. The inverted second early data DATA2B Early may be acquired by causing the phase of the inverted second transmission data to be led by 'CIJ' and amplifying the magnitude of the inverted second transmission data by 'x/2'. The second late data DATA2 Late may be acquired by causing the phase of the second transmission data to be delayed by 'CIJ' and amplifying the magnitude of the second transmission data by 'x/2'. Then, the second inverted crosstalk generation unit adds the inverted second early data DATA2B Early and the second late data DATA2 Late to generate a positive inverted crosstalk pulse having a magnitude of 'x'.

Finally, the first addition unit adds the positive inverted crosstalk pulse to the transmission data to be transmitted to the first transmission line and generates and outputs first compensation data.

In the even mode, when the first transmission data transitions in the positive direction, the second transmission data also transitions in the positive direction. In this case, a positive crosstalk having a magnitude of 'x' may occur in the receiver of the first transmission line.

Therefore, the second inverted crosstalk generation unit generates inverted second early data DATA2B Early and second late data DATA2 Late. The inverted second early data DATA2B Early may be acquired by causing the phase of the inverted second transmission data to be led by 'CIJ' and amplifying the magnitude of the inverted second transmission data by 'x/2'. The second late data DATA2 Late may be acquired by causing the phase of the second transmission data to be delayed by 'CIJ' and amplifying the magnitude of the second transmission data by 'x/2'. Then, the second inverted crosstalk generation unit adds the inverted second early data DATA2B Early and the second late data DATA2 Late to generate a negative inverted crosstalk pulse having a magnitude of 'x'.

Finally, the first addition unit adds the negative inverted crosstalk pulse to the transmission data to be transmitted to the first transmission line and generates and outputs first compensation data.

In the static mode, when the first data transitions in the positive direction, the second data does not transition. Therefore, the static mode does not generate an inverted crosstalk pulse.

Figure 7:
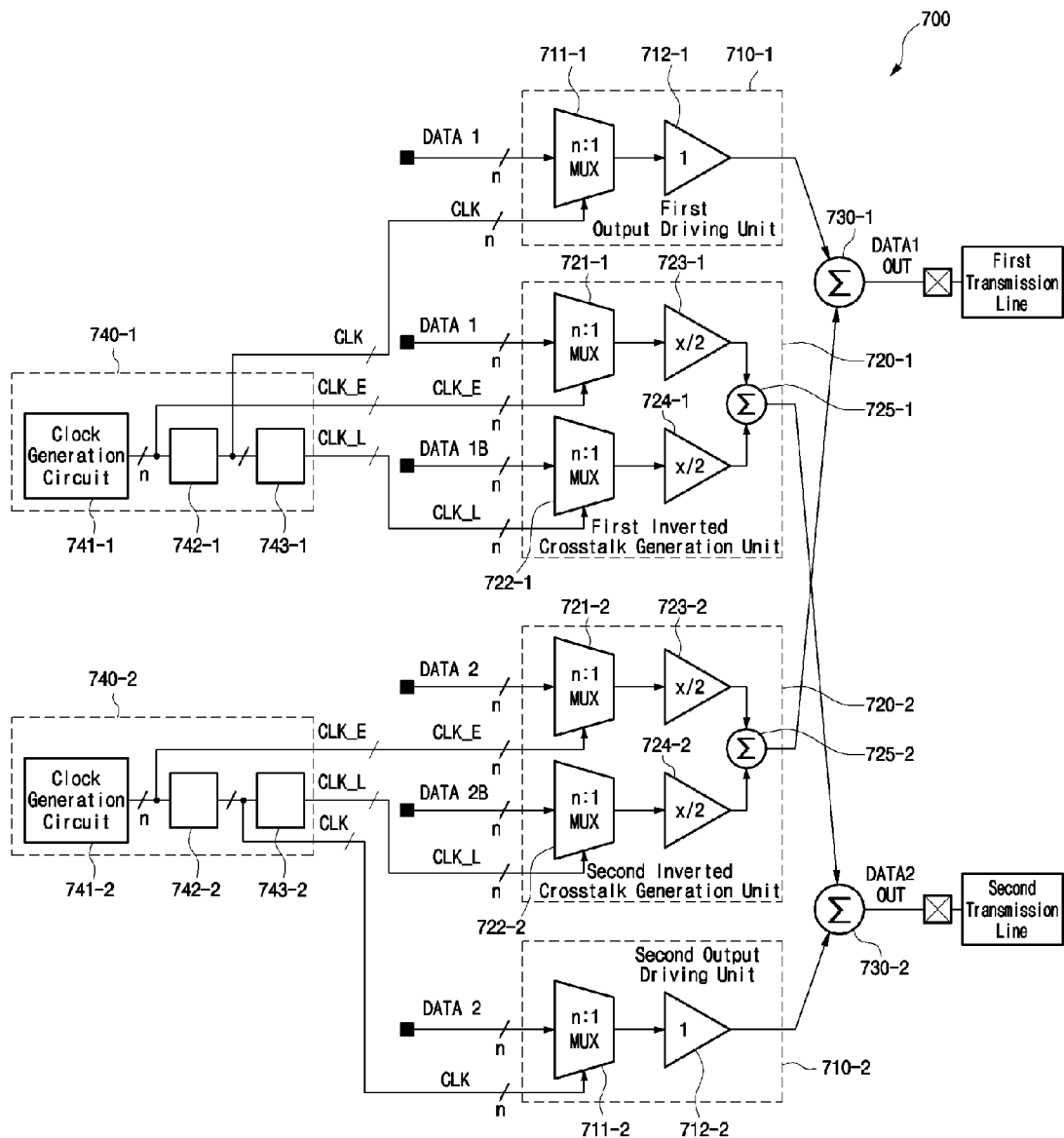
FIG. 7 is a detailed configuration diagram of the transmitter system for transmitting parallel data by compensating for a crosstalk according to the embodiment of the present invention.

FIG. 7 is a detailed configuration diagram of the transmitter system for transmitting parallel data by compensating for a crosstalk according to the embodiment of the present invention.

Referring to FIG. 7, the transmitter system 700 for transmitting parallel data by compensating a crosstalk according to the embodiment of the present invention includes first and second output driving units 710-1 and 710-2, first and second inverted crosstalk generation units 720-1 and 720-2, first and second addition units 730-1 and 730-2, and first and second clock generation units 740-1 and 740-2.

Referring to FIG. 7, the operation of the transmitter system for transmitting parallel data by compensating for a crosstalk according to the embodiment of the present invention will be described as follows.

First, it is assumed that the transmitter system according to the embodiment of the present invention has two data transmission lines adjacent in parallel, an inductive coupling coefficient is larger than a capacitive coupling coefficient, and first and second transmission data are parallel data of n lines (n is a natural number).

In the following descriptions, data transmitted to a receiver through a first data transmission line is referred to as first transmission data, and data transmitted to the receiver through a second data transmission line is referred to as second transmission data.

The transmitters which add an inverted crosstalk pulse to the first and second transmission data to generate first and second compensation data, respectively, have the same structure. Therefore, the following descriptions will be focused on only the detailed components of the first clock generation unit 740-1, the first output driving units 720-2, the second inverted crosstalk generation unit 720-2, and the first addition unit 730-1 for generating the first compensation data.

First, the first clock generation unit 740-1 includes a clock generation circuit 741-1, a first delay element 742-1, and a second delay element 743-1.

The first clock generation unit 741-1 is configured to generate an early clock signal CLK_E having n different phases for synchronizing transmission data inputted to the output driving unit 710 and the inverted crosstalk generation unit 720 and converting parallel data of n lines into serial data.

The first delay element 742-1 is configured to delay the early clock signal CLK_E by 'CIJ' and generate an intermediate clock signal CLK having n different phases, and the second delay element 743-1 is configured to delay the intermediate clock signal CLK by 'CIJ' and generate a late clock signal CLK_L having n different phases.

The first output driving unit 710-1 includes a first driving unit_multiplexer 711-1 and a first driving unit_amplifier 711-2.

The first driving unit_multiplexer 711-1 is configured to arbitrarily or sequentially select one of parallel first transmission data of n lines in response to the intermediate clock signal CLK, and convert the selected data into the first transmission data of one line having a phase difference from each other, and the first driving unit_amplifier 712-1 is configured to amplify an output of the first driving unit_multiplexer 711-1 to a magnitude of '1' and output first driving data.

The second inverted crosstalk generation unit 720-2 includes first and second_second generation unit_multiplexers 721-2 and 722-2, first and second_second generation unit_ amplifiers 723-2 and 724-2, and a second generation unit_ adder 725-2.

The first_second generation unit_multiplexer 721-2 is configured to arbitrarily or sequentially select one of parallel second transmission data of n lines in response to the early clock signal CLK_E and convert the selected data into the second transmission data of one line having a phase difference from each other.

The first_second generation unit_amplifier 723-2 is configured to amplify an output of the first_second generation unit_multiplexer 721-1 to 'x/2' and output the second early data DATA2 Early.

The second_second generation unit_multiplexer 722-2 is configured to arbitrarily or sequentially select one of inversed parallel second transmission data of n lines in response to the late clock signal CLK_L and convert the selected data into the inverted second transmission data of one line having a phase difference from each other.

The second_second generation unit_amplifier 724-2 is configured to amplify an output of the second_second generation unit_multiplexer 722-2 to 'x/2' and output the inverted second late data DATA2B Late.

The second generation unit_adder 725-2 is configured to combine the second early data DATA2 Early and the inverted second late data DATA2B Late to generate a negative inverted crosstalk pulse. In this case, an ideal negative inverted crosstalk pulse may have a width of 'CIJ' and a height of 'x'.

The first addition unit 730-1 combines the negative inverted crosstalk pulse and the driving data and outputs the first compensation data. The first compensation data may compensate for a positive crosstalk which may occur when the first transmission data is transmitted as it is, and reduce a timing jitter occurring in the receiver by adding the negative inverted crosstalk pulse.

As such, when three parallel data (the first and second transmission data and the inverted second transmission data) of n lines are converted into transmission data of one line by the respective multiplexers, clock signals having different phases, that is, the early clock signal, the intermediate clock signal, and the late clock signal may be used to simply generate the second early data DATA2 Early and the inverted second late data DATA2B Late, as described with reference to FIGS. 5 and 6.

However, the above descriptions may correspond to only one embodiment of the present invention, and the multiplexers may be adjusted depending on lines of parallel data. Furthermore, the second early data DATA2 Early and the inverted second late data DATA2B Late may be realized by a variety of different circuits.

Figure 8:
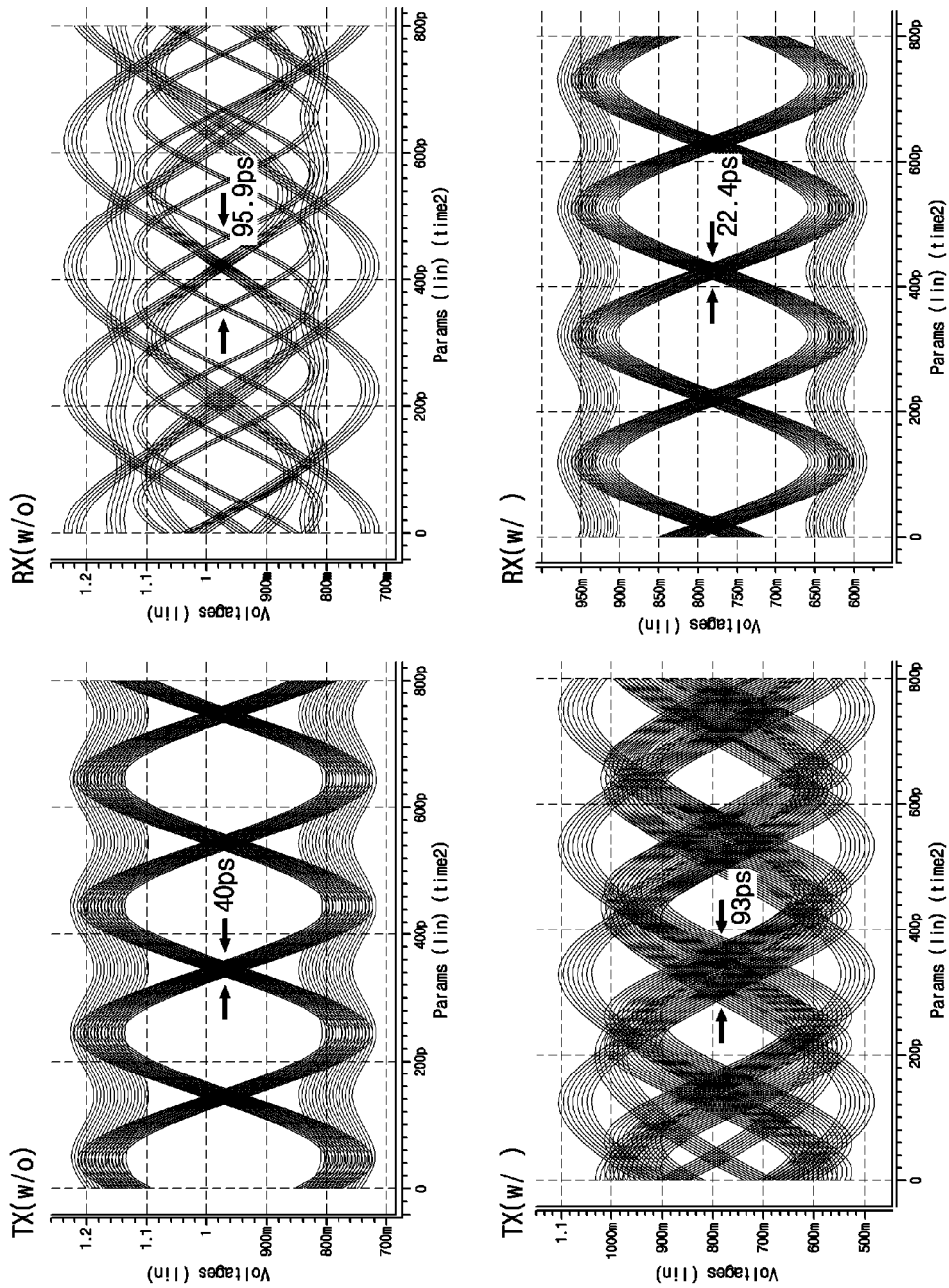
FIG. 8 includes diagrams showing simulation results obtained by using the transmitter system for transmitting parallel data by compensating a crosstalk according to the embodiment of the present invention, in micro strip transmission lines.

FIG. 8 includes diagrams showing simulation results obtained by using the transmitter system according to the embodiment of the present invention, in micro strip transmission lines. In this simulation, a data rate of 5 Gbps, in which one period interval is 200 ps, was used.

The simulation condition is as follows: a printed circuit board (PCB) has a dielectric thickness of 8 mil and a width of 14 mil, a distance between the micro strip transmission lines is set to 5 mil, and a distance between the receiver and the transmitter is set to 5 inch (12.5 cm). At this time, the simulation results are obtained by checking an eye diagram in the receiver when data outputted from the transmitter passes through the micro strip transmission lines and then comes to the receiver.

Referring to FIG. 8, two diagrams positioned in the upper side show data waveforms in the receiver/transmitter when a conventional transmitter is used, and two diagrams positioned in the lower side show data waveforms in the receiver/transmitter when the transmitter compensating for a crosstalk according to the embodiment of the present invention is used.

The conventional transmitter outputs the same data regardless of the data mode. Therefore, after the data passes through the transmission lines, a large jitter of 95.9 ps occurs in the receiver, due to a difference in transmission time depending on the data mode.

On the other hand, the transmitter according to the embodiment of the present invention previously compensates for an inverted crosstalk pulse according to the data mode, and outputs data. Therefore, after the data passes through the transmission lines, a jitter in the receiver is reduced to 22.4 ps in comparison with when the conventional transmitter is used.

Furthermore, a time margin in the eye diagram is improved from 104.1 ps (200 ps-95.9 ps) to 177 ps (200 ps-22.4 ps), that is, by about 73.5 ps.

FIG. 9 is an expanded diagram showing simulation results obtained by using the transmitter system for transmitting parallel data by compensating a crosstalk according to the embodiment of the present invention, in micro strip transmission lines.

According to the embodiments of the present invention, the transmitter previously compensates an effect of crosstalk and transmits parallel data, thereby reducing a timing jitter caused by the crosstalk.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A transmitter system for transmitting parallel data by compensating a crosstalk, comprising:
   first and second transmission lines parallel to each other;
   a first inverted crosstalk pulse generation unit configured to receive first transmission data and inverted first transmission data and output a first inverted crosstalk pulse according to a data mode;
   a second inverted crosstalk pulse generation unit configured to receive second transmission data transmitted in parallel to the first transmission data and inverted second transmission data and output a second inverted crosstalk pulse according to the data mode;
   a first addition unit configured to combine the first transmission data and the second inverted crosstalk pulse and output first compensation data to be transmitted to the first transmission line; and
   a second addition unit configured to combine the second transmission data and the first inverted crosstalk pulse and output second compensation data to be transmitted to the second transmission line,
   wherein the first inverted crosstalk pulse generation unit comprises:
   a first_first generation unit_multiplexer configured to select and output one line of the first transmission data of n lines in response to early clock signals;

a second_first generation unit_multiplexer configured to select and output one line of the inverted first transmission data of n lines in response to late clock signals;

a first_first generation unit_amplifier configured to amplify an output of the first_first generation unit_multiplexer to ½ of a magnitude of a receiver crosstalk and output first early data;

a second_first generation unit_amplifier configured to amplify an output of the second_first generation unit_multiplexer to ½ of the magnitude of the receiver crosstalk and output inverted first late data; and a first generation unit_adder configured to combine the first early data and the inverted first late data and output the first inverted crosstalk pulse.

2. The transmitter system according to claim 1, wherein the data mode comprises:

an odd mode in which transition directions of the first and second transmission data are different from each other;

an even mode in which the transition directions of the first and second transmission data are the same as each other; and a static mode in which at least one of the first and second transmission data does not transition.

3. The transmitter system according to claim 2, wherein when the first and second transmission data respectively transition, an inductive coupling coefficient by mutual inductance is larger than a capacitive coupling coefficient by mutual capacitance.

4. The transmitter system according to claim 3, wherein, when the first transmission data transitions in the positive direction, in the odd mode, the first inverted crosstalk pulse comprises a positive inverted crosstalk pulse and the second inverted crosstalk pulse comprises a negative inverted crosstalk pulse, in the even mode, the first and second inverted crosstalk pulses comprise a positive inverted crosstalk pulse, and in the static mode, the first inverted crosstalk pulse comprises a positive inverted crosstalk pulse, and the second inverted crosstalk pulse is not generated.

5. The transmitter system according to claim 4, wherein the positive inverted crosstalk pulse and the negative inverted crosstalk pulse have a width equal to a timing jitter in a receiver and a magnitude equal to the magnitude of the crosstalk in the receiver.

6. The transmitter system according to claim 2, wherein, when the first and second transmission data respectively transition, a capacitive coupling coefficient by mutual capacitance is larger than an inductive coupling coefficient by mutual inductance.

7. The transmitter system according to claim 6, wherein, when the first transmission data transitions in the positive direction, in the odd mode, the first inverted crosstalk pulse comprises a negative inverted crosstalk pulse and the second inverted crosstalk pulse comprises a positive inverted crosstalk pulse, in the even mode, the first and second inverted crosstalk pulses comprise a negative inverted crosstalk pulse, and in the static mode, the first inverted crosstalk pulse comprises a negative inverted crosstalk pulse, and the second inverted crosstalk pulse is not generated.

8. A transmitter system for transmitting parallel data by compensating for a crosstalk, comprising:

first and second transmission lines parallel to each other;

a first output driving unit configured to receive parallel first transmission data, convert the received first transmission data into serial data, and output first driving data;

a second output driving unit configured to receive parallel second transmission data, convert the received second transmission data into serial data, and output second driving data;

a first inverted crosstalk pulse generation unit configured to receive the first transmission data and inverted first transmission data and output a first inverted crosstalk pulse according to a data mode;

a second inverted crosstalk pulse generation unit configured to receive the second transmission data and inverted second transmission data and output a second inverted crosstalk pulse according to the data mode;

a first addition unit configured to combine the first driving data and the second inverted crosstalk pulse and output first compensation data to be transmitted to the first transmission line; and a second addition unit configured to combine the second driving data and the first inverted crosstalk pulse and output second compensation data to be transmitted to the second transmission line, wherein the first inverted crosstalk pulse generation unit comprises:

a first_first generation unit_multiplexer configured to select and output one line of the first transmission data of n lines in response to early clock signals;

a second_first generation unit_multiplexer configured to select and output one line of the inverted first transmission data of n lines in response to late clock signals;

a first_first generation unit_amplifier configured to amplify an output of the
first_first generation unit_multiplexer to ½ of a magnitude of a receiver crosstalk and output first early data;

a second_first generation unit_amplifier configured to amplify an output of the second_first generation unit_multiplexer to ½ of the magnitude of the receiver crosstalk and output inverted first late data and a first generation unit_adder configured to combine the first early data and the inverted first late data and output the first inverted crosstalk pulse.

9. The transmitter system according to claim 8, wherein the data mode comprises:

an odd mode in which transition directions of the first and second driving data are different from each other;

an even mode in which the transition directions of the first and second driving data are the same as each other; and a static mode in which at least one of the first and second driving data does not transition.

10. The transmitter system according to claim 9, wherein, when the first and second driving data respectively transition, an inductive coupling coefficient by mutual inductance is larger than a capacitive coupling coefficient by mutual capacitance.

11. The transmitter system according to claim 10, further comprising first and second clock generation units configured to generate clock signals for synchronizing data inputted to the first and second output driving units and the first and second inverted crosstalk pulse generation units, respectively, wherein each of the first and second clock generation units comprises:

a clock generation circuit configured to output the early clock signals having n different phases;

a first delay element configured to output intermediate clock signals obtained by delaying the early clock signals by a timing jitter of a receiver; and a second delay element configured to output the late clock signals obtained by delaying the intermediate clock signals by the timing jitter.

12. The transmitter system according to claim 11, wherein the first output driving unit comprises:

a first driving unit_multiplexer configured to select and output one line of the first transmission data of n lines in response to the intermediate clock signals;

a second driving unit_amplifier configured to amplify an output of the first driving unit_multiplexer to a magnitude of 1 and output the first driving data, and the second output driving unit comprises:

a second driving unit_multiplexer configured to select and output one line of the second transmission data of n lines in response to the intermediate clock signals;

a second driving unit_amplifier configured to amplify an output of the second driving unit_multiplexer to a magnitude of 1 and output the second driving data.

13. The transmitter system according to claim 8, wherein the second inverted crosstalk pulse generation unit comprises:

a first_second generation unit_multiplexer configured to select and output one line of the second transmission data of n lines in response to the early clock signals;

a second_second generation unit_multiplexer configured to select and output one line of the inverted second transmission data of n lines in response to the late clock signals;

a first_second generation unit_amplifier configured to amplify an output of the first_second generation unit_multiplexer to ½ of the magnitude of the receiver crosstalk and output second early data;

a second_second generation unit_amplifier configured to amplify an output of the second_second generation unit_ multiplexer to ½ of the magnitude of the receiver crosstalk and output inverted second late data; and a second generation unit_adder configured to combine the second early data and the inverted second late data and output the second inverted crosstalk pulse.

14. A transmitter system for transmitting parallel data by compensating for an effect of crosstalk, comprising:

first to N transmission lines parallel to each other, wherein N is a natural number equal to three or larger than three;

a first inverted crosstalk pulse generation unit configured to receive first transmission data and inverted first transmission data and output a first inverted crosstalk pulse according to a data mode;

an (N−1)-th inverted crosstalk pulse generation unit configured to receive (N−1)-th transmission data and inverted (N−1)-th transmission data and output an (N−1)-th inverted crosstalk pulse according to the data mode;

an N-th inverted crosstalk pulse generation unit configured to receive N-th transmission data and inverted N-th transmission data and output an N-th inverted crosstalk pulse according to the data mode;

a first addition unit configured to combine the first transmission data and a second inverted crosstalk pulse and output first compensation data to be transmitted to the first transmission line;

an (N−1)-th addition unit configured to combine the (N−1)-th transmission data, an (N−2)-th inverted crosstalk pulse, and the N-th inverted crosstalk pulse and output (N−1)-th compensation data to be transmitted to the (N−1)-th transmission line; and an N-th addition unit configured to combine the N-th transmission data and the (N−1)-th inverted crosstalk pulse and output N-th compensation data to be transmitted to the N-th transmission line, wherein the N-th inverted crosstalk pulse generation unit comprises:

a first_N-th generation unit_multiplexer configured to select and output one line of the N-th transmission data of n lines in response to early clock signals;

a second_N-th generation unit_multiplexer configured to select and output one line of the inverted N-th transmission data of n lines in response to late clock signals;

a first_N-th generation unit amplifier configured to amplify an output of the first_N-th generation unit multiplexer to ½ of a magnitude of a receiver crosstalk and output N-th early data a second_N-th generation unit amplifier configured to amplify an output of the second_N-th generation unit_multiplexer to ½ of the magnitude of the receiver crosstalk and output inverted N-th late data; and a N-th generation unit_adder configured to combine the N-th early data and the inverted N-th late data and output the N-th inverted crosstalk pulse.

15. The transmitter system according to claim 14, wherein the data mode comprises:

an odd mode in which transition directions of transmission data adjacent to each other are different from each other;

an even mode in which the transition directions of the transmission data adjacent to each other are the same as each other; and a static mode in which at least one of the transmission data adjacent to each other does not transition.

* * * * *